United States Patent [19]

Smith

[11] Patent Number: 5,339,755
[45] Date of Patent: Aug. 23, 1994

[54] DRY SCRUBBER WITH CONDENSING HEAT EXCHANGER FOR CYCLE EFFICIENCY IMPROVEMENT

[75] Inventor: J. William Smith, Massillon, Ohio

[73] Assignee: The Babcock & Wilcox Company, New Orleans, La.

[21] Appl. No.: 104,974

[22] Filed: Aug. 10, 1993

[51] Int. Cl.$^5$ .............................................. F23J 15/00
[52] U.S. Cl. ...................................... 110/345; 110/215; 110/216; 110/234; 423/243.01; 422/168
[58] Field of Search ............... 423/243.01, 244.07; 422/168; 110/233, 234, 345, 215, 216

[56] References Cited

U.S. PATENT DOCUMENTS

| | | | |
|---|---|---|---|
| 4,624,190 | 11/1986 | Cappi | 110/215 |
| 4,726,302 | 2/1988 | Hein et al. | 110/345 |
| 5,220,875 | 6/1993 | Cox | 110/345 |
| 5,246,680 | 9/1993 | Pikkujämsä | 244/7 |

Primary Examiner—Edward G. Favors
Attorney, Agent, or Firm—Robert J. Edwards; Eric Marich

[57] ABSTRACT

A system for controlling sulfur dioxide ($SO_2$) in a flue gas produced by a boiler comprises an air heater connected to the boiler for cooling the flue gas produced by the boiler. A dry scrubber is connected to the air heater and a slurry source for receiving the heated flue gas and a slurry in order to remove $SO_2$ from the flue gas. A particulate collector is connected to the dry scrubber in order to collect particles from the flue gas. Heat is recovered from the flue gas by connecting a condensing heat exchanger to the particulate collector; and a condensate recycler is connected to the condensing heat exchanger and the slurry source for reducing the water requirements for the system.

13 Claims, 1 Drawing Sheet

DRY SCRUBBER WITH CONDENSING HEAT EXCHANGER FOR CYCLE EFFICIENCY IMPROVEMENT

FIELD AND BACKGROUND OF THE INVENTION

The present invention relates in general to power plants and their emissions, and in particular to a new and useful system and method for increasing the efficiency of power plants using condensing heat exchangers.

It is well-known in the power plant field to use a dry scrubber for controlling emissions of sulfur dioxide ($SO_2$) contained within the flue gas produced by these plants. It is a common problem or process constraint for power plants employing dry scrubbers to maintain a minimum gas temperature for the dry scrubber which is required for a flue gas scrubbing process. This minimum gas temperature is established by the requirements for evaporating water in a scrubber slurry in the dry scrubber while still achieving the desired temperature in the scrubber process.

As a general rule, the greater the sulfur content of the flue gas and the greater the required $SO_2$ removal efficiency, the higher the minimum gas temperature is required for the dry scrubber. This minimum gas temperature requirement sets a limit on the achievable efficiency for the boiler, i.e. the ability to minimize the heat loss in the exhaust gas, and thus limits the efficiency of the cycle.

U.S. Pat. No. 4,956,162 to Smith et al. discloses a known system for removing $SO_2$ from a flue gas. This system, however, has a limited cycle efficiency due to the minimum gas temperature requirements as described above.

Presently, there is no known system or method which can improve the cycle efficiency for a dry scrubber system.

SUMMARY OF THE INVENTION

The present invention overcomes the cycle limitations commonly found in known systems by providing additional heat recovery in a unique system which also comprises a condensing heat exchanger.

The present invention provides a system for controlling sulfur dioxide ($SO_2$) in a flue gas produced by a boiler and comprises an air heater connected to the boiler for cooling the flue gas produced by the boiler. A slurry source is also provided. A dry scrubber is connected after the air heater and the slurry source for receiving the cooled flue gas and a slurry in order to remove $SO_2$ from the flue gas. Particulate collection means, such as a baghouse, is connected to the dry scrubber for collecting particles from the flue gas. A condensing heat exchanger is connected to the particulate collection means for recovering heat from the flue gas which, in turn, improves the cycle efficiency of the system. Condensate recycle means is also provided for reducing the water requirements of the system.

It is an object of the present invention to provide a system for controlling $SO_2$ in a flue gas for improving the cycle efficiency of the system.

It is another object of the present invention to provide a system for controlling $SO_2$ in a flue gas which reduces the water requirements for the system.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
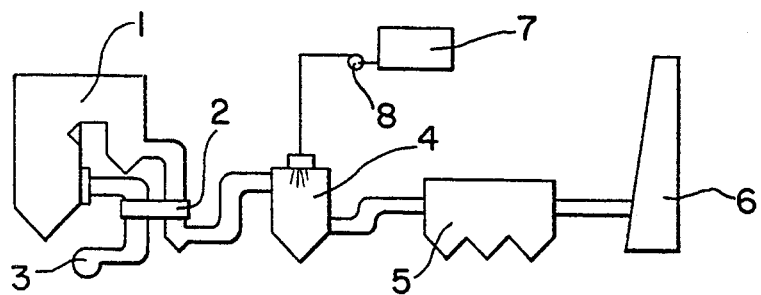
FIG. 1 is a schematic view of a known $SO_2$ removal system.

FIG. 1 illustrates a known system for removing $SO_2$ from the flue gas produced by a boiler 1. An air heater 2 is connected to the boiler 1 for cooling the flue gas, while heating the combustion air, which is produced and passed by the boiler 1. The cooled flue gas is channeled to a dry scrubber 4 for removing $SO_2$ from the flue gas.

A slurry source 7, such as a slurry tank, provides a slurry through a slurry pump 8 into the dry scrubber 4 for removing the $SO_2$ from the flue gas. A baghouse 5 is connected to the dry scrubber 4 in order to collect particles from the flue gas after the scrubbing process has been performed in the dry scrubber 4. A stack 6 is connected to the baghouse 5 for venting $SO_2$-free exhaust from the system. A forced draft (FD) fan 3 is connected to the air heater 2 and the boiler 1.

The present invention provides a means for overcoming the cycle limitations of known systems by providing additional heat recovery for the system and by reducing the water requirements for the system.

Figure 2:
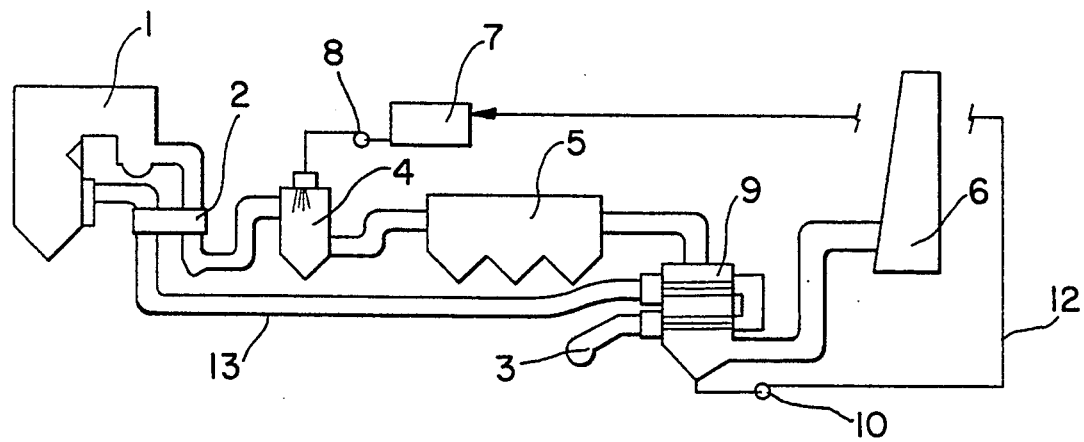
FIG. 2 is a schematic view of an $SO_2$ removal system according to the present invention.

The same reference numerals are used to designate the same or functionally similar parts. According to the present invention, FIG. 2 illustrates a novel system for removing $SO_2$ from the flue gas of a boiler 1. Similar to the known systems, an air heater 2 is connected to the boiler 1 for cooling the flue gas produced by the boiler 1, which in turn, is provided to the dry scrubber 4 which receives the slurry from the slurry source 7 through the slurry pump 8. Once $SO_2$ is removed from the flue gas in the dry scrubber 4, a particulate collector, such as a baghouse 5, is used to collect particles from a flue gas.

Unlike the known systems, a condensing heat exchanger 9 is connected to the particulate collector 5 in order to recover heat for the system through primarily condensing water vapor in the flue gas stream which has left the dry scrubber 4. This water vapor condensed by the condensing heat exchanger 9 results from both the combustion products (hydrogen and moisture in the fuel) and from water evaporated in the dry scrubber 4.

Figure 3:
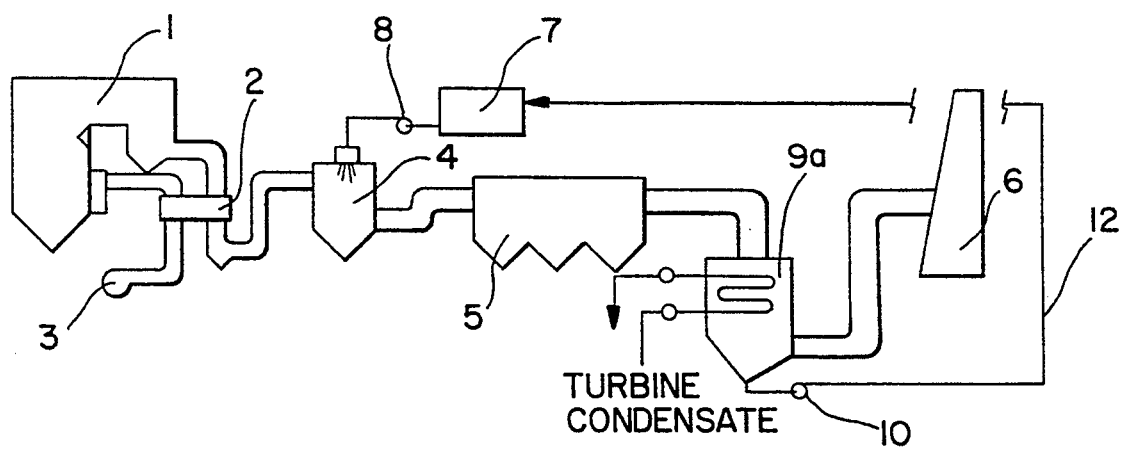
FIG. 3 is a schematic view of a second embodiment of an $SO_2$ removal system according to the present invention.

The condensing heat exchanger 9, illustrated in FIG. 2, is air-cooled through the use of an FD fan 3 connected to the condensing heat exchanger 9. FIG. 3 illustrates a condensing heat exchanger 9a which is water-cooled by a water source, such as turbine condensate.

As shown in FIGS. 2 and 3, condensate produced by the condensing heat exchangers 9 (FIG. 2) and 9a (FIG.

3) is recycled by a condensate recycle channel 12 which is connected to the slurry tank 7 and pumped by condensate return pump 10 in order to reduce the water requirements for the dry scrubber 4 and the system in general. Also, a stack 6 is connected to the condensing heat exchangers 9 and 9a, as shown in FIGS. 2 and 3 respectively, in order to allow cleaned flue gas to exit the system.

FIG. 2 illustrates an air channel 13 connected to the condensing heat exchanger 9 and the air heater 2 and the boiler 1. Combustion air is first used as the working fluid in the condensing heat exchanger 9 with the heated air leaving the heat exchanger 9 and being directed through air channel 13 to the air heater 2, which is similar to an air heater of a conventional system, which in turn, provides the heated air back into the boiler 1. According the system disclosed by the present invention, the heat recovered is eventually transferred to the high pressure steam cycle of the system.

FIG. 3 also illustrates an FD fan 3 connected to the heat exchanger 2 and the boiler 1, similar to the known systems.

Although condensing heat exchangers are not novel as heat recovery devices, they are, however, limited in their application due to the relationship between the dew point temperature of the gas mixture and the heat sink working fluid temperature generally found in the power plant. In many combustion processes, the dew point temperature is too low to permit practical heat recovery by a condensing system. With the inclusion of a dry scrubber, the dew point is elevated which makes the condensing heat exchanger more practical.

The present invention allows for an increase in power generation efficiency over known systems. The present invention also provides for a means for reducing the make-up water requirements for the dry scrubber in an $SO_2$ removal system.

While a specific embodiment of the invention has been shown and described in detail to illustrate the application of the principles of the invention, it will be understood that the invention may be embodied otherwise without departing from such principles.

What is claimed is:

1. A system for controlling sulfur dioxide ($SO_2$) in a flue gas produced by a boiler, the system comprising:
   an air heater connected to the boiler for cooling the flue gas produced by the boiler;
   a slurry source;
   a dry scrubber connected to the air heater and the slurry source for receiving the heated flue gas and a slurry from the slurry source for removing $SO_2$ from the flue gas;
   particulate collection means connected to the dry scrubber for collecting particles from the flue gas;
   a condensing heat exchanger connected to the particulate collection means for recovering heat from the flue gas; and
   condensate recycle means connected to the condensing heat exchanger and the slurry source.

2. The system according to claim 1, including a stack connected to the condensing heat exchanger for passing the flue gas from the system.

3. The system according to claim 1, wherein the condensing heat exchanger is cooled by air.

4. The system according to claim 1, wherein the condensing heat exchanger is cooled by water.

5. The system according to claim 3, including means for channeling air from the condensing heat exchanger connected to the air heater for introducing heated air into the boiler.

6. The system according to claim 5, wherein the particulate collection means comprises a baghouse.

7. The system according to claim 3, wherein a fan is connected to the condensing heat exchanger for heating the air.

8. The system according to claim 4, wherein a fan is connected to the air heater.

9. The system according to claim 4, wherein the particulate collection means comprises a baghouse.

10. A method for removing sulfur dioxide ($SO_2$) from a flue gas produced by a boiler, the method comprising:
    cooling the flue gas produced by the boiler;
    providing a slurry source to a dry scrubber;
    removing $SO_2$ from the flue gas in the dry scrubber;
    collecting particulate from the flue gas;
    recovering heat from the flue gas in a condensing heat exchanger; and
    recycling condensate produced by the condensing heat exchanger back into the system.

11. The method according to claim 10, wherein the condensing heat exchanger is cooled by air.

12. The method according to claim 10, wherein the condensing heat exchanger is cooled by water.

13. The method according to claim 11, including channeling air from the condensing heat exchanger back into the boiler.

* * * * *